Figure 6:
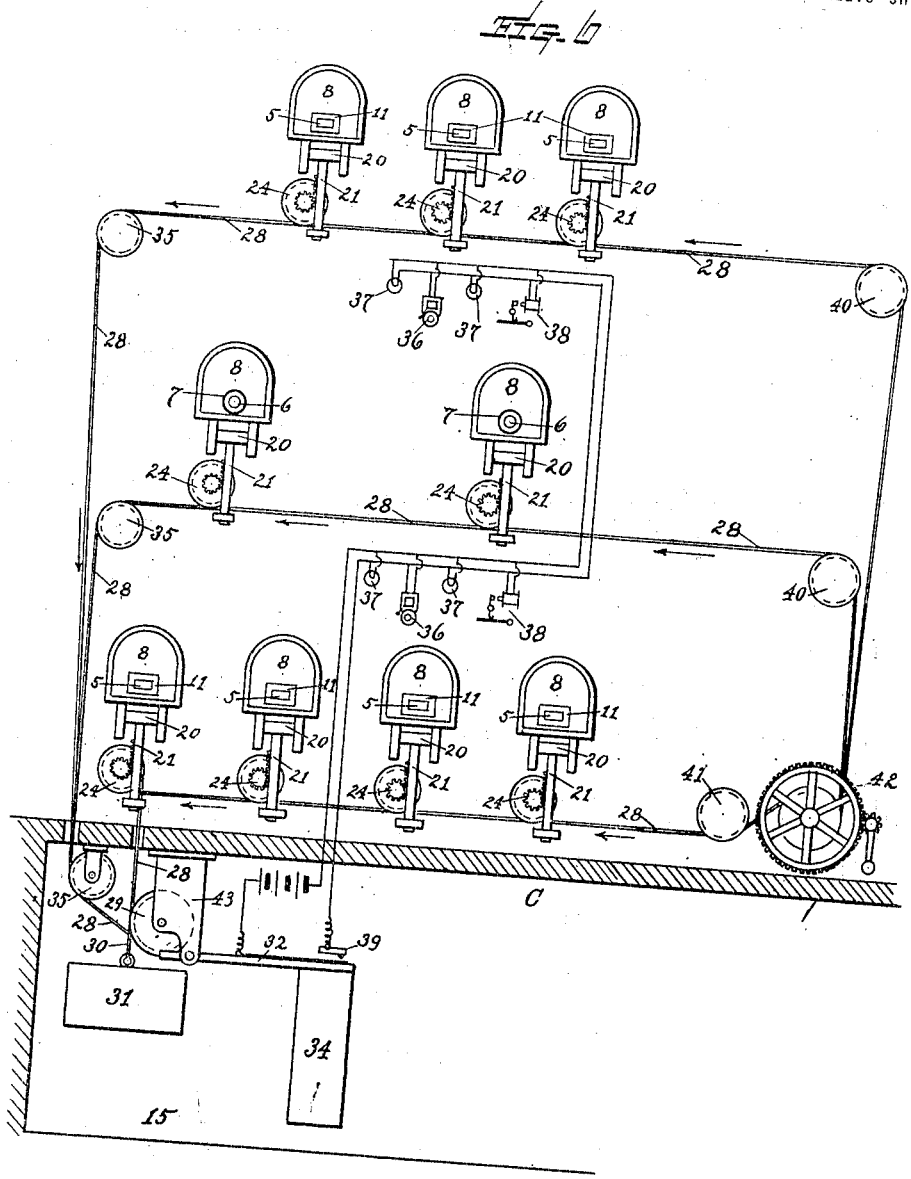

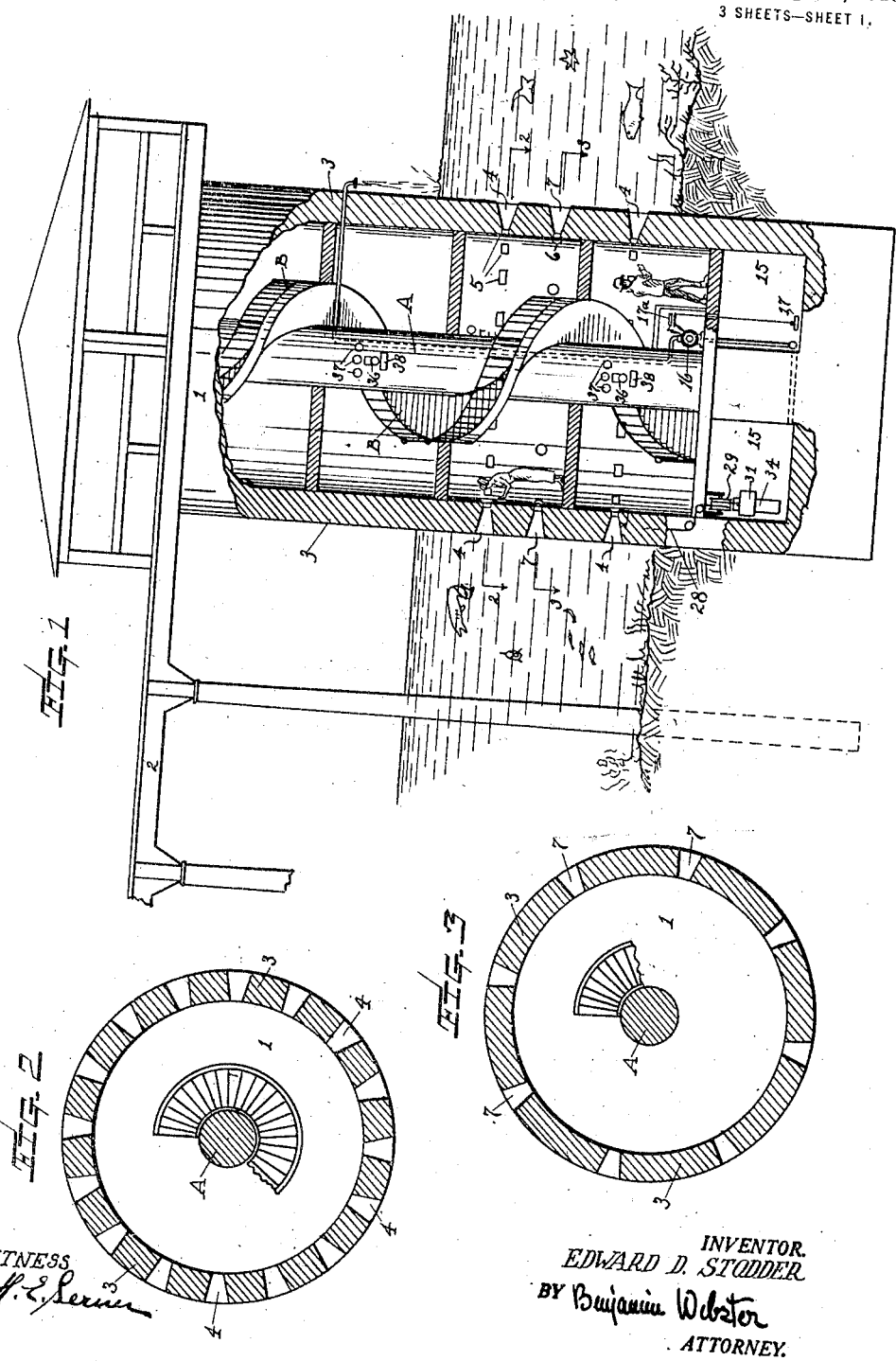

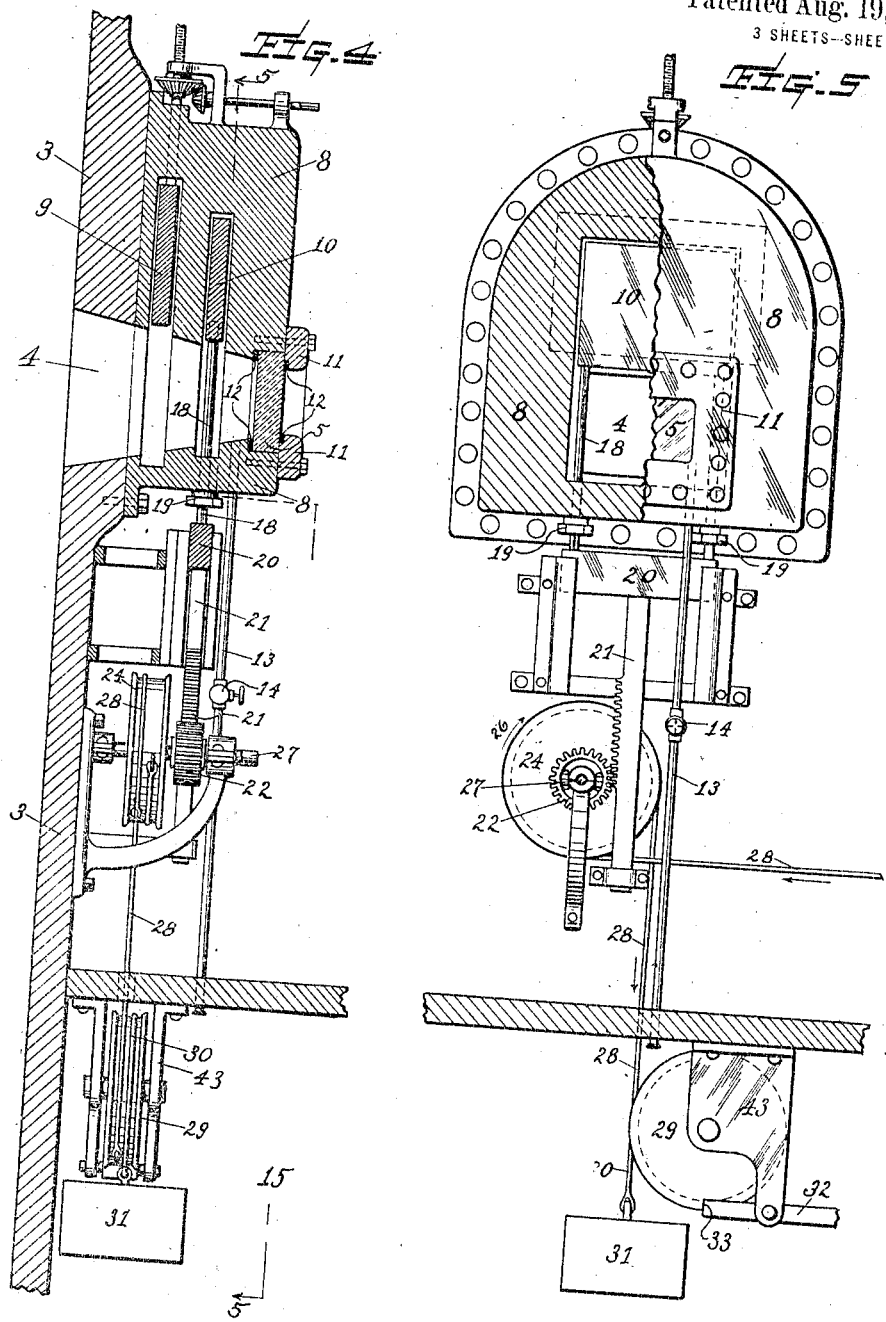

E. D. STODDER.
SUBMARINE OBSERVATORY.
APPLICATION FILED MAY 22, 1916.

1,313,838.

Patented Aug. 19, 1919.
3 SHEETS—SHEET 3.

WITNESS

INVENTOR.
EDWARD D. STODDER
BY Benjamin Webster
ATTORNEY.

UNITED STATES PATENT OFFICE.

EDWARD D. STODDER, OF NEW ROCHELLE, NEW YORK.

SUBMARINE OBSERVATORY.

1,313,838.  Specification of Letters Patent.  Patented Aug. 19, 1919.

Application filed May 22, 1919. Serial No. 298,893.

*To all whom it may concern:*

Be it known that I, EDWARD D. STODDER, a citizen of the United States, residing at New Rochelle, in the county of Westchester and State of New York, have invented certain new and useful Improvements in Submarine Observatories, of which the following is a specification.

The object of my invention is to provide a practical, perfectly safe type of structure inside of which, for scientific and other purposes, people can go down below the surface of the ocean or other body of water, look out through glass-covered openings and observe and study the fish, crabs, sea-weed and such other things as may be in the water in front of said openings, in other words, view marine life in Nature's own aquarium.

Submergible caissons provided with observation apertures exist in the art. These devices are unsafe and complex in structure. Applicant has perfected a submarine observatory that is strong and durable, with power to withstand all ordinary and extraordinary forces liable to be exerted against it, of such size and proportions as to permit a large number of observers to be admitted at the same time; that has means for illuminating the water in the field of view; and that has safety devices against flooding the chamber and for warning the observers.

Glass continually in water without means for cleaning the side in contact with the water, becomes coated with a substance that interferes with clear observation through it. In order that the windows may be kept clear, means are provided whereby the glasses may be taken out to clean, and replaced in the observatory openings below the surface of the water. Means are also provided for lighting the surrounding water when desired. Batteries of lamps may be placed outside the caissons for illuminating the water from above.

As one or more of the glasses may get broken by accident and water pour into the observatory, to prevent its quickly filling with water and drowning any of the occupants, automatic safety devices, set in operation by the inflowing water, are designed to start a pump, give a warning signal, close emergency valves and shut off the inflowing water, as described hereinafter. Auxiliary means are also provided for closing each aperture by hand in case of the breaking of the observation glass.

Referring to the accompanying drawings:

Figure (1), is a side elevation, partly in section, of one of the observatories and part of a pier by which it may be reached from the shore.

Fig. (2) is a horizontal sectional view through line 2—2 of Fig. (1), showing the arrangement of the lookout openings on the upper and lower levels.

Fig. (3) is a horizontal sectional view through line 3—3 of Fig. (1), showing the arrangement of lighting openings between the two rows of lookout openings.

Fig. (4) is a vertical side elevation partly in section, showing some details of the main valves, emergency valves, and means for the automatic operation of the emergency valves.

Fig. (5) is a front elevation on the line 5—5 of Fig (4), showing the emergency valves and means by which it would be automatically closed in case the glass in its opening or any other opening should get broken.

Fig. (6) is a diagrammatic view showing how all the emergency valves are interconnected and may be simultaneously closed by mechanism set in operation by means of a float that is raised by incoming water.

In carrying out my invention, I construct a large, very strong, hollow, water-tight caisson, 1, adjacent to a pier, 2, or other suitable structure, by means of which the caisson may be entered through an opening above the water. These caissons should be placed where the water is so deep that the sand on the sea-bottom would not be much affected by wave action. The caisson may be constructed of wood, iron, concrete, or other suitable material or combination of materials. The lower part in the ground may be made solid. A large central pillar A is surrounded by a stairway B. The wall, 3, of the caisson above the ground level is provided with openings, 4, having glass covers, 5, through which people on the inside can look out and see whatever is in the water in front of them. Lights, 6, are arranged inside of other glass covered openings 7, to light up the outside surroundings at night or such other times as may be desired. These openings for observations and lights may be located as shown or at any other place in such manner or number as desired depending upon the dimensions of the caisson and the depth of the water in which it is constructed. The openings, 4, may be of any desired shape or size, but by making them funnel-shaped as shown, a person with eyes close to the small opening on the inside would obtain a large scope of view on the outside and by placing the glass at the small end, it would be subjected to the minimum amount of strain and the least danger of being broken. The glasses used to cover the openings may be of any desired thickness and of such size and shape as to conform to the openings for which they are designed.

The glass covers are held securely in place by clamps, 11, fastened to the valve casing, 8. Suitable gaskets, 12, to make water tight and reduce liability of breakage are placed between the glass and metal surroundings. A valve casing, 8, of any suitable size, shape and construction, is secured to the caisson wall, 3, one over each of the openings, 4 and 7, and the glass clamped over the opening on the inner side of said valve casing as shown in Fig. 4. In each of these valve casings there are two valve gates or plates, one, 9, nearest the caisson wall of ordinary type operated by any well-known mechanism from a point adjacent to the valve casing; and another, 10, an emergency valve, that is automatically closed in case of water pouring through a broken glass, as described hereinafter. By closing the valve gate, 9, the glass is relieved of the water pressure, then clamp, 11, that holds the glass in place, may be taken off, the glass taken out, cleaned, reclamped in place, and the valve gate, 9, opened again, thus providing a view through clean glass. Inasmuch as the water in the openings, 4 and 7, may at times become dirty from operating the valves or other causes, drainage pipes, 13, are provided to draw off the dirty water. The upper ends of these pipes being connected to the lower inside of the valve casings, 8, by opening the valve, 14, the dirty water runs into the sump, 15. When it is desired to take out a glass and the valve 9 is closed, the water in the space between the valve plate and the glass can be drawn off by opening the valve 14. The sump, 15, located below the lower floor of the observatory, into which water from all of these drainage pipes would flow as well as all other seepage or leakage that might occur, is kept clear of surplus water by means of an electrically-operated pump, 16, of the ordinary type in common use for such purposes, which is started or stopped by the rising or falling movement respectively of the float, 17, operating the electric switch, 17ª.

In case one or more of the glasses should get broken and water pour in faster than this pump could pump it out, or for any other reason, such as a glass getting broken when the electric power should happen to be off, an automatic "safety first" arrangement, connected with and started to operate by means of a float, 34, which is adapted to be raised by the inflowing water, would simultaneously close all emergency valves 10.

The emergency valve gate, 10, is connected by rods, 18, passing though stuffing boxes, 19, to a cross-head, 20, and the cross-head is connected to a rack-bar, 21, the rack-bar meshing with a pinion, 22, and the pinion is connected to a wheel, 24, or both the pinion and wheel are keyed to the same shaft so as to turn with it.

Each of the wheels, 24, is connected by a cable, 28, directly to or by interconnection with other wheels to the master wheel or drum, 29, which may be located in the sump, as shown, or in any other suitable place.

The face of this master wheel or drum 29, is wide enough for two or more cables to be wrapped about and fastened to it. The lower end of the counter-weight cable, 30, is fastened to counter-weight, 31, the upper end of said cable being wrapped around and fastened to the master wheel, 29.

A notch is made in the rim of the wheel, 29, into which the end of the counter-weighted lever, 32, fits somewhat as shown at 33. A counter-weight, 34, is attached to the other end of the lever, 32; this counter-weight, 34, is made so that it floats in water yet is of sufficient weight so that when suspended in air as shown, it causes the end of the lever to stick in the notch in the rim of the wheel, as shown at 33, and prevents the wheel from being turned by the pull of the counter-weight, 31. The proportions and weight of the lever, 32, and counter-weight, 34, are such that as water rises up under and around the floatable counter-weight, 34, lever, 32, is moved, and the wheel, 29, released and turned by the counter-weight, 31, falls and pulls on cable, 30.

The lower end of each of the vertical cables, 28, is fastened to the master wheel, 29, supported in bearing flanges, 43, and the upper end of each connected to a set of mechanism on a different level; one cable to the first level, another to the second and the other to the third level.

As all the emergency valves have a similar set of operating mechanism, all the sets on the same level are interconnected so as to close simultaneously by wrapping its cable, 28, around each of the wheels, 24, on the same level; or the motion and power may be transmitted simultaneously to all the wheels by means of short pieces of cable wrapped and clamped and thus connecting each wheel to the next one on the same level and transmitting the desired motion from one to the other when the cables, 28, are moved in the direction indicated by the arrows adjoining them.

From the foregoing description, it is obvious that, should a glass cover over any opening get broken, the water, as it poured in, would run into the sump; and as the water rose in the sump, it would raise the counter-weight, 34, tip the lever, 32, and release the master wheel, 29; the counter-weight, 31, would fall, pull down on the cable, 30, and turn the wheel, 29, pull the cables, 28, in the direction indicated by the arrows adjoining them, turn all the wheels, 24, and pinions, 22, in the direction indicated by the arrow, 26, in Fig. 5, pull down all the rack-bars, 21, and thus each and every emergency valve, 10, being connected to said rack-bars, by means of the cross-heads, 20, and rods, 18, would be simultaneously closed.

In order to open all of the emergency valves simultaneously, the following mechanism is provided:

A winding mechanism, 42, is placed preferably on the lower level, C, and cables from the operating wheels, 24, connected therewith, are passed over guiding pulleys, 40 and 41, as shown in Fig. 6. Ordinarily the connecting cables are slack.

If for any purpose, such as inspection, repairs or adjustments, it is desired to cut out the emergency operating mechanism of any observation or lighting unit and have the emergency mechanism of the other ready for operation, the two short pieces of cable, 28, one on each side of the unit it is desired to cut out, could be removed and one long piece inserted in place of the two short ones so connecting the mechanism on both sides of the part cut out that the remainder of the mechanism would operate independently thereof, and while the one is cut out.

The projecting end of each of the shafts, 27, to which the wheel and pinion are fastened, may be squared or so shaped that by means of a wheel, wrench or equivalent device applied to it, the valve, 10, may be operated, either opened or closed, by hand when disconnected from the other units.

Various alarm and signal means may be placed in suitable places. The float, 34, closes a switch, 39, to close the circuits. Signal lamps, 37, an alarm bell 36, and an indicating arm, 38, are shown above.

If desired, the mechanism on the different levels may be interconnected with each other by short pieces of cable and thereby operated from one level to another in like manner to those on any one level. In case of any part of the structure or mechanism interfering with the vertical parts of the cable, 28, passing directly from the master wheel, 29, to the wheels, 24, guiding sheaves such as 35, Fig. 6, may be so placed as to guide said cables in any direction. Other sheaves or rollers (not shown) may be so placed between the wheels, 24, as to keep the horizontal parts of the cables, 28, in alinement with the wheels, 24, and to tension the cables.

It is apparent that my submarine observatory is strong, safe and durable. Modifications of structure may be made within the scope of my invention without departing from the spirit thereof, and such modifications are intended to be embraced in the annexed claims.

I claim:

1. A submarine observatory comprising a caisson, a stairway in said caisson, observation windows below the water level, means for illuminating the water in the field of view from said windows, and an electrically operated pump, and a float for automatically actuating said pump.

2. A submarine observatory comprising a caisson, a stairway in said caisson, observation windows below the water level, means for illuminating the water adjacent said windows, and a float for automatically operating danger signal mechanism.

3. A submarine observatory comprising a caisson, a series of observation apertures therein, glass plates in said apertures, and means for automatically closing said apertures upon the breakage of any of these glass plates.

4. A submarine observatory having an observation aperture therein, a glass plate in said aperture, and a plate for closing said aperture automatically operated by means of a float in the bottom of said observatory.

5. A submarine observatory having an observation aperture therein, a glass plate in said aperture, a plate for closing said aperture, a float in the bottom of said observatory and a mechanism whereby said second-named plate is operated by said float.

6. A submarine observatory comprising a caisson, an observation floor in said caisson, an observation aperture above said floor, a sump below said floor, a float in said sump, a glass plate in said aperture, a second plate for closing said aperture, mechanism for operating said second plate comprising a weight, and means whereby the rise of the float releases said weight.

7. In a submarine observatory, an observation aperture, a transparent plate therein, a second plate for closing said aperture, mechanism for operating said second plate comprising a drum, a weight suspended from and for turning said drum, means for preventing the rotating of said drum, and means for releasing said last-named means.

8. In a submarine observatory, an observation aperture, a transparent plate therein, a second plate for closing said aperture, mechanism for operating said second plate comprising a drum, a weight suspended from and for turning said drum, means for preventing the operation of said weight in turning said drum, and a float for releasing said means.

9. A submarine observatory having an observation aperture therein, a glass plate in said aperture, an auxiliary plate for closing said aperture, rods attached to said auxiliary plate, a cross-head in which said rods are fastened, a rack-bar connected with said crosshead, and means for operating said rack-bar comprising a pinion.

10. In a submarine observatory, a series of apertures covered with glass plates, auxiliary plates in said apertures, drums for operating said auxiliary plates, a master drum, means operatively connecting said drums with the master, and means for turning said master drum.

11. In a submarine observatory, a series of apertures covered with glass plates, auxiliary plates in said apertures, drums for operating said auxiliary plates, a master drum, means operatively connecting said drums with said master drum, means for turning said master drum, means for locking said master drum against turning, and means for releasing said locking means.

12. In a submarine observatory, a caisson with a plurality of apertures in its wall below the water level, a valve casing with a glass cover secured over each of said apertures, and an emergency valve plate, and an independently operated valve plate in each of said valve casings, and automatically operating mechanism by means of which the emergency valves in all valve casings would be simultaneously closed should a glass in any opening get broken.

In testimony whereof I affix my signature.

EDWARD D. STODDER.